(12) United States Patent
Dixon

(10) Patent No.: US 9,974,236 B1
(45) Date of Patent: May 22, 2018

(54) COMBINE SYSTEM

(71) Applicant: Carl R. Dixon, Weiner, AR (US)

(72) Inventor: Carl R. Dixon, Weiner, AR (US)

( * ) Notice: Subject to any disclaimer, the term of this patent is extended or adjusted under 35 U.S.C. 154(b) by 0 days. days.

(21) Appl. No.: 14/839,954

(22) Filed: Aug. 29, 2015

Related U.S. Application Data

(60) Provisional application No. 62/044,063, filed on Aug. 29, 2014.

(51) Int. Cl.
*B60P 1/00* (2006.01)
*A01D 57/20* (2006.01)
*A01D 41/12* (2006.01)
*A01F 12/60* (2006.01)
*B65G 67/24* (2006.01)
*B65G 19/14* (2006.01)
*B65G 19/22* (2006.01)
*B65G 19/28* (2006.01)

(52) U.S. Cl.
CPC ............. *A01D 57/20* (2013.01); *A01D 41/12* (2013.01); *A01F 12/60* (2013.01); *B65G 19/14* (2013.01); *B65G 19/22* (2013.01); *B65G 19/28* (2013.01); *B65G 67/24* (2013.01); *B65G 2201/042* (2013.01); *B65G 2812/02128* (2013.01); *B65G 2814/0326* (2013.01)

(58) Field of Classification Search
CPC ....................................................... B60P 1/38
USPC ....... 414/528, 532, 538, 470, 492, 502, 505, 414/523
See application file for complete search history.

(56) References Cited

U.S. PATENT DOCUMENTS 5,888,044 A * 3/1999 Baskerville ............... B60P 1/42
198/311
7,988,403 B2 * 8/2011 Ricketts ............... A01D 90/105
414/505

* cited by examiner

*Primary Examiner* — Saul Rodriguez
*Assistant Examiner* — Willie Berry, Jr.
(74) *Attorney, Agent, or Firm* — Schrantz Law Firm, PLLC; Stephen D. Schrantz

(57) ABSTRACT

The combine system provides a motor driven paddle system for the movement of grain from combine storage, such as a hopper, to secondary storage, including but not limited to a grain bin, truck, or grain cart. The paddles are constructed from a somewhat rigid material that enable the paddles to move the grain to the secondary storage. The paddle conveyor may be partially enclosed by a housing that protects users from accidental contact with the paddles and the paddle conveyor.

3 Claims, 7 Drawing Sheets

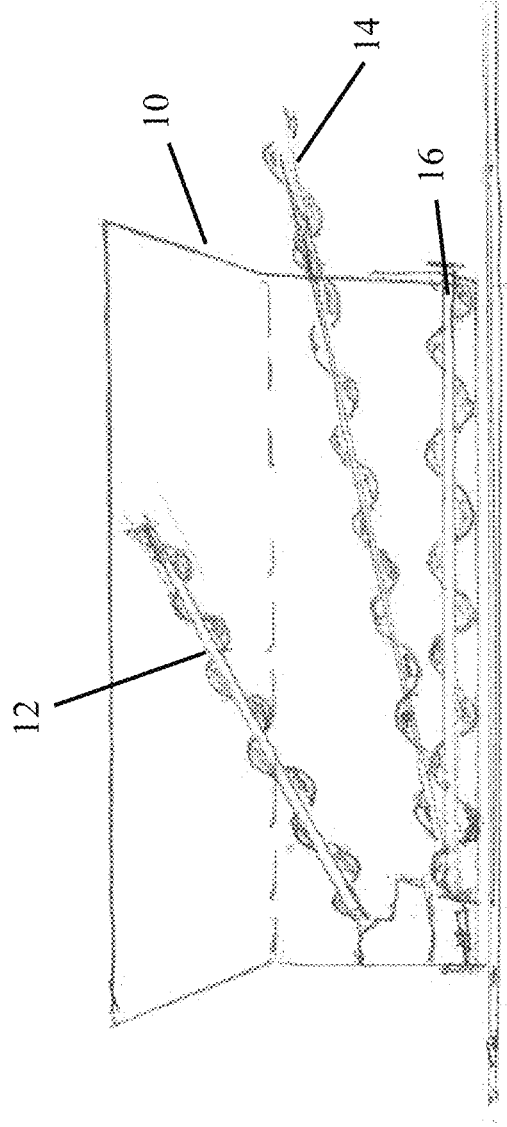
FIG. 1 -- PRIOR ART --
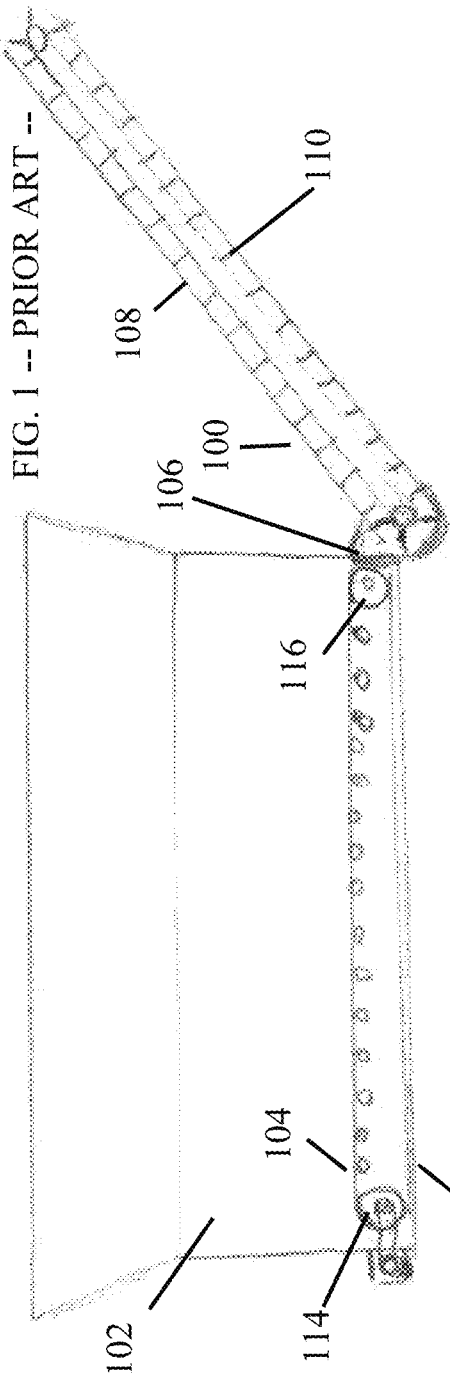
FIG. 2

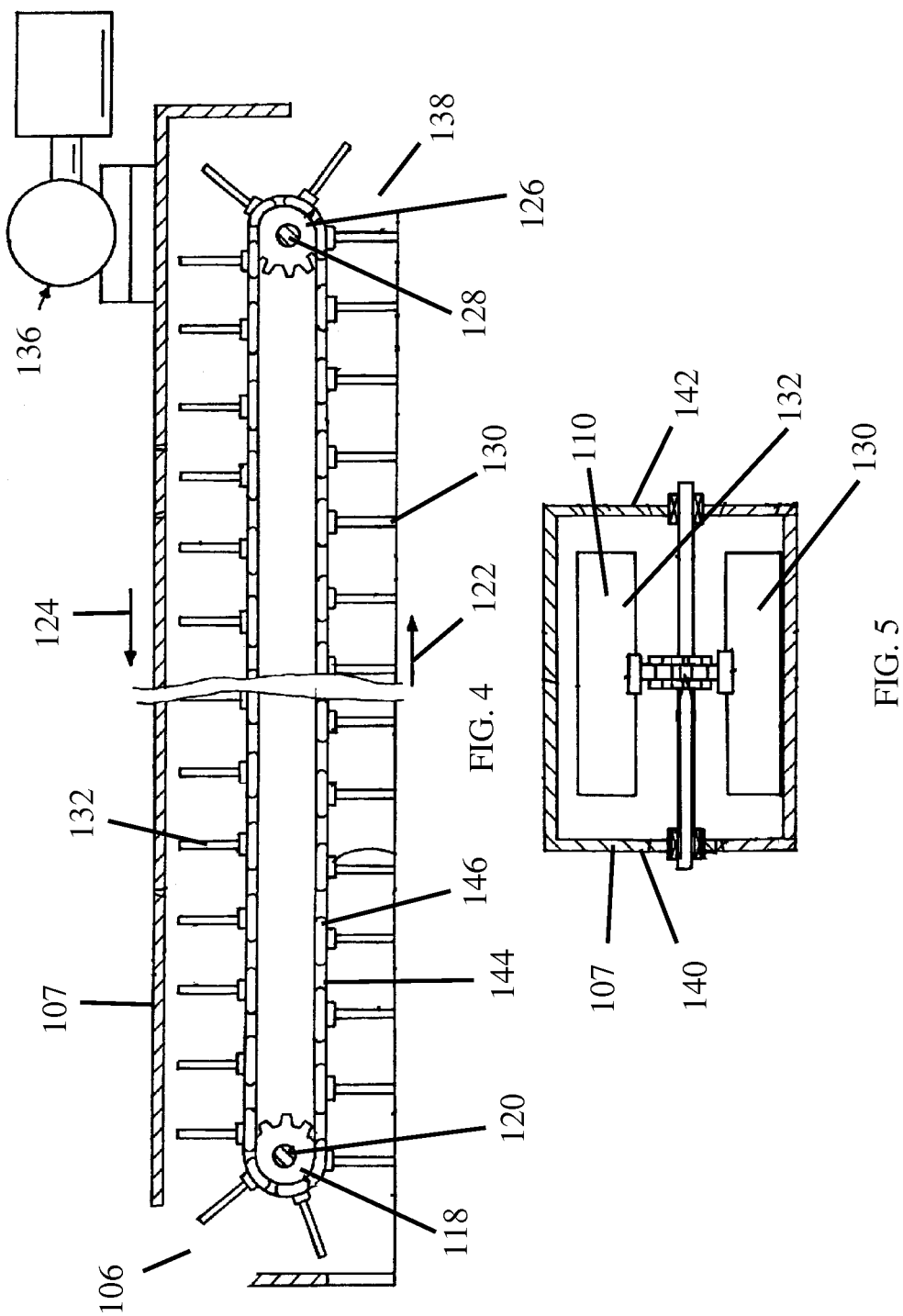

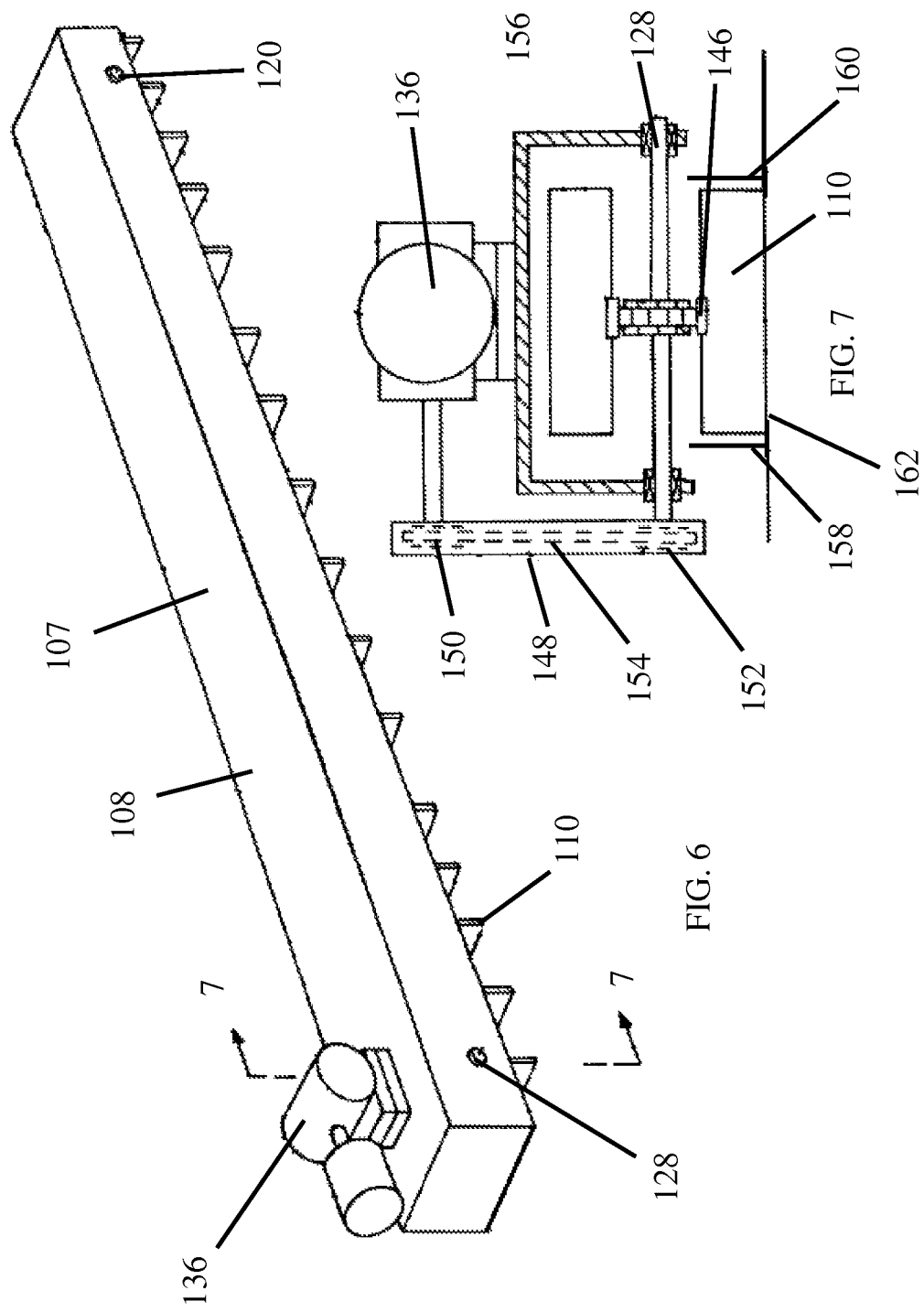

COMBINE SYSTEM

CROSS-REFERENCE TO RELATED APPLICATIONS

This application claims priority to and is a continuation in part of U.S. Patent Application No. 62/044,063 filed on Aug. 29, 2014 entitled Combine System.

STATEMENT REGARDING FEDERALLY SPONSORED RESEARCH OR DEVELOPMENT

Not Applicable.

REFERENCE TO A MICROFICHE APPENDIX

Not Applicable.

RESERVATION OF RIGHTS

A portion of the disclosure of this patent document contains material which is subject to intellectual property rights such as but not limited to copyright, trademark, and/or trade dress protection. The owner has no objection to the facsimile reproduction by anyone of the patent document or the patent disclosure as it appears in the Patent and Trademark Office patent files or records but otherwise reserves all rights whatsoever.

BACKGROUND OF THE INVENTION

1. Field of the Invention

The present invention relates generally to moving grain during the harvest. The present invention replaces the screw auger system currently implemented in grain conveyors. The present invention provides a new and safer conveyor system.

II. Description of the Known Art

The combine harvester, or simply combine, is a machine that harvests grain crops. The combine reaps, threshes, and winnows the grain crops to process the grain. Among the crops harvested with a combine are wheat, oats, rye, barley, corn, soybeans and flax. The waste straw left behind on the field is the remaining dried stems and leaves of the crop with limited nutrients which is either chopped and spread on the field or baled for feed and bedding for livestock.

Typically, a combine cuts the crop material, threshes the grain therefrom, separates the grain from the straw, and cleans the grain before storing the grain in an onboard tank. Straw and crop residue is ejected from the rear of the machine.

In conventional combines, the harvested grain is stored in an on-board grain tank. The grain is removed from the grain tank by a main unloading auger positioned within an unloading chute. This unloading chute permits the grain to be transferred into a bulk transport vehicle such as a truck or wagon, which is positioned on the one side of the combine harvester where the exit port of the unloading chute is located. The auger creates an unnecessary hazard as the auger may cause bodily harm to a user. The PTO driving the auger could also cause bodily harm.

Accordingly, it would be desirable to provide an improved device and system for unloading grain from a combine.

Patents and patent applications disclosing relevant information are disclosed below. These patents and patent applications are hereby expressly incorporated by reference in their entirety.

U.S. Pat. No. 6,499,930 issued to Dixon ("the '930 patent") teaches an unloading system for a grain bin. The unloading system taught by the '930 patent includes a sweep conveyor for sweeping grain from the interior of the grain bin to a well in the floor of the grain bin. The sweep conveyor taught by the '930 patent includes an elongated frame, a first sprocket at one end of the frame, a second sprocket at the other end of the frame, an endless chain extending between the first and second sprockets, a plurality of spaced apart paddles attached to the chain, and a motor for causing the chain to rotate whereby the paddles will drag or sweep grain to the well in the floor of the grain bin.

U.S. Pat. No. 7,040,980 issued to Ketsel ("the '980 patent") teaches a combine harvester for harvesting grain and seed crops that includes a double unloading auger system for unloading in both directions of travel harvested feed grains produced in one round or two lengths of a field to storage area of transport vehicle. The double unloading auger system taught by the '980 patent has a first main unloading auger assembly being selectively operable for discharging the harvested grain from a first side of the combine harvester to the transport vehicle and a second main unloading auger assembly being selectively operable for discharging the harvested grain from a second side of the combine harvester to the transport vehicle. A pair of transverse auger taught by the '980 patent is located in a bottom wall of the grain tank and is selectively reversibly driven for delivery of the harvested grain from the grain tank to either the first main unloading auger assembly or the second main unloading auger assembly. As a result, if one unloading auger system is inoperative the combine taught by the '980 patent can be continued operating at a reduced capacity until the inoperative auger system is repaired.

U.S. Pat. No. 5,718,556 issued to Forsyth on Feb. 17, 1998 ("the '556 patent") teaches a bulk granular material transport system having multiple compartments with a detachable elevating conveyor to permit the conveyor to assist with unloading as well as loading of the transport device. Each compartment taught by the '556 patent may be individually discharged onto a horizontal conveyor which delivers the seed to the elevating conveyor when the elevating conveyor is in its first position. The elevating conveyor taught by the '556 patent is suspended from an adjustable crane which is pivotable on the frame of the transport system. The elevating conveyor taught by the '556 patent may be released from its first position such that the discharge of the elevating conveyor may be positioned over a compartment of the transport device. All mechanisms taught by the '556 patent are individually actuable through a remote control device.

SUMMARY OF THE INVENTION

The present invention provides a method and system for moving grain during harvest. A drag-chain sweep system provides a new and safe method for moving grain by a combine tractor in harvesting said grain at the field level. The system replaces the current screw-auger system. The present invention provides a much longer lasting wear factor.

Currently, within nearly all grain movement systems, a screw-auger tool is used with much safety precautions to achieve a movement of grain from the field to a proper grain storage unit for later use. The drag-chain sweep system is a safer, faster alternative to the aforementioned screw auger system. The present invention provides an enclosed belt system with attached rubber paddles at intervals needed for the job to provide a no-limit point to point moving process where safety is key and time is not wasted or misused. The grain is cut and separated from the plant by combine tractor units. With this system, the conveyor, such as a belt system, transfers the grain to the enclosed paddle system. The enclosed paddle system, which is powered by a motor, such as a hydraulic motor, pulls the grain out of the hopper storage through an adjacent arm to unload out of the hopper to secondary storage, such as a grain buggy, bin, cart, or other storage.

By enclosing the paddle belt system, safety is insured as no human contact with moving parts is required. The enclosure reduces an increasing amount of screw-auger related injuries or malfunctions. Current systems are limited in productivity due to safety precautions and the systems' inability to move grain at a rate faster than the augers are able to rotate. By implementing the drag-chain paddle system, the amount of grain moved is only limited to the amount of grain that can be fed to the system and safety is insured by protecting the worker from exposure to the moving parts.

It is an object of the present invention to provide a safer working environment for a farmer.

It is also an object of the present invention to eliminate the need for an auger system inside of the combine.

It is also an object of the present invention to enclose the grain conveying system to provide a safer work environment.

It is also an object of the present invention to move grain at a faster rate.

It is also an object of the present invention to protect the user from exposure to the moving parts These and other objects and advantages of the present invention, along with features of novelty appurtenant thereto, will appear or become apparent in the course of the following descriptive sections and the attached drawings.

BRIEF DESCRIPTION OF THE DRAWINGS

In the following drawings, which form a part of the specification and which are to be construed in conjunction therewith, and in which like reference numerals have been employed throughout wherever possible to indicate like parts in the various views:

FIG. 1 is a sectional view of a known grain moving system;

FIG. 2 is a sectional view of one embodiment of the present invention;

FIG. 4 is a sectional view thereof;

FIG. 5 is a sectional view thereof;

FIG. 6 is a top perspective view of one embodiment of the present invention;

FIG. 7 is a sectional view thereof;

DETAILED DESCRIPTION

Figure 3:
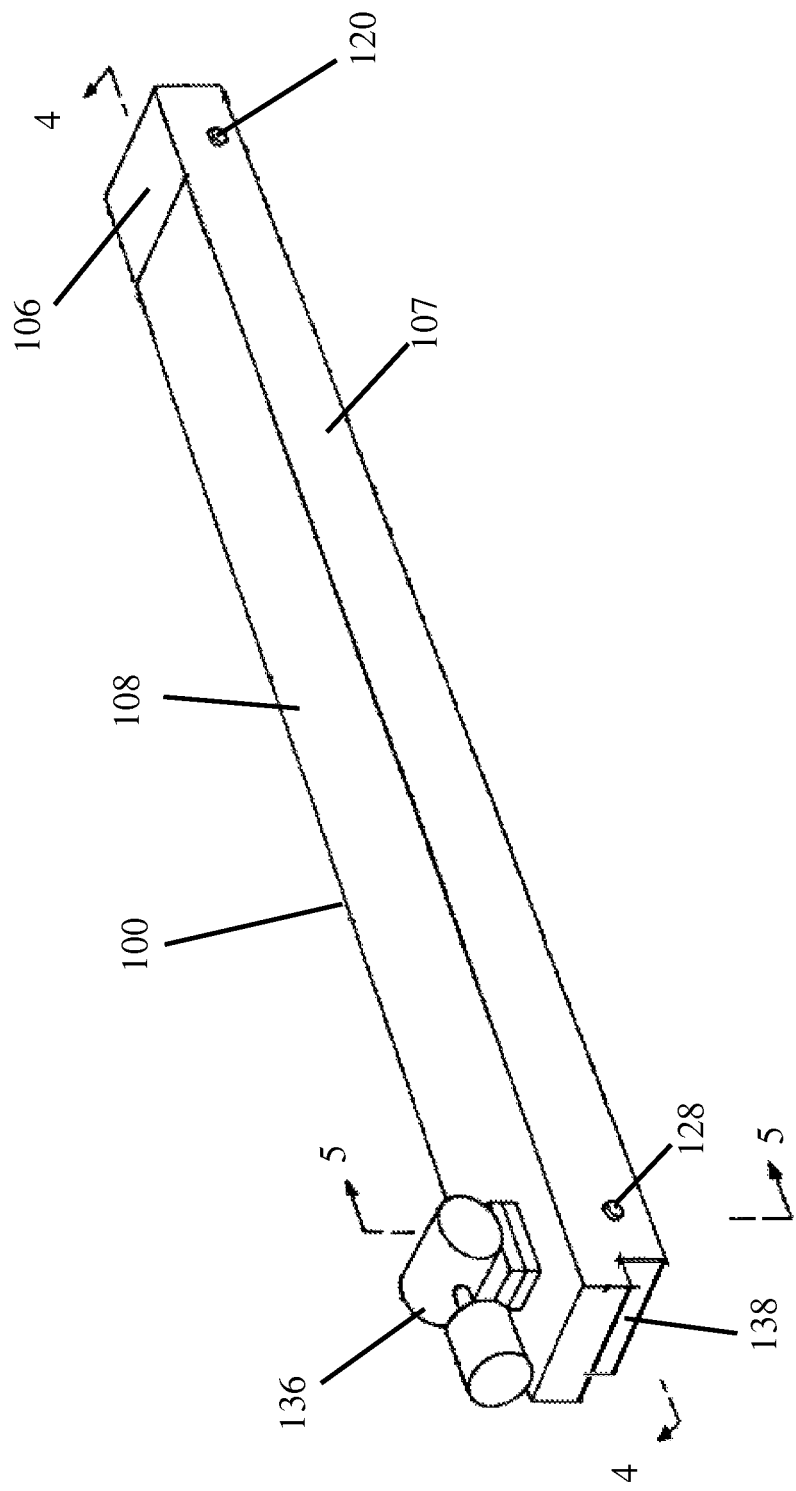
FIG. 3 is a top perspective view of one embodiment of the paddle conveyor of one embodiment of the present invention.

FIG. 1 shows a sectional view of a known grain system 10 with augers 12, 14, 16. Augers 12, 14, 16 assist with transferring the grain outside of the bin of system 10.

FIG. 2 shows a sectional view of one embodiment of the unloading system 100. The combine processes the grain and transfers the grain to storage 102, such as hopper storage. As the storage 102 fills, the grain must be transferred from storage 102 such that combine can continue to operate.

Conveyor 104, a flat belt conveyor which can be as wide as necessary, moves the grain towards paddle conveyor 108. Opening 106 allows the grain to flow from conveyor 104 to the paddle conveyor 108. Paddles 110 push the grain upwards to secondary storage, such as a transport vehicle, such as a cart or truck, or to a grain bin.

The unloading system 100 is a safer, faster alternative to the aforementioned screw auger system 10. The present invention provides a paddle conveyor 108 with attached rubber paddles 110 at intervals needed for the job. Paddles 110 provide a no-limit point to point moving process where safety is key and time is not wasted or misused. The grain is cut and separated from the plant by combine tractor units.

With this system, the grain is moved by the conveyor 104 to the paddle conveyor 108. The conveyor 104 pushes the grain out of storage 102, the grain storage, of the combine. Conveyor 104 pushes the grain into paddle conveyor 108 to transfer the grain from storage 102. The paddle conveyor 108 and conveyor 104 of one embodiment are powered by hydraulic motors.

The conveyor 104 pushes the grain out of the hopper storage 102 through an adjacent arm to unload the grain from the hopper to the paddle conveyor 108. The paddles 110 push the grain out of the hopper to a different storage, such as a portable storage, grain buggy unit, etc. The grain is then stored in the storage. If the grain is transferred to portable storage, the grain is transported to a proper grain storage unit elsewhere.

By enclosing the paddle conveyor 108 as shown in FIG. 3, safety is insured. The enclosure limits human contact with moving parts to reduce an increasing amount of screw-auger related injuries or malfunctions. Current systems are limited in productivity due to safety precautions and the systems' inability to move grain at a rate faster than the augers are able to rotate. By implementing the drag-chain paddle system, the amount of grain moved is only limited to the amount of grain that can be fed to the system. Safety is insured by protecting the worker from exposure to the moving parts.

The unloading system 100 of the present invention unloads grain from the interior of the combine storage 102. The combine storage 102 may be of any typical construction providing a housing having wall structure and floor or floor structure for supporting a quantity of grain. Thus, for example, the combine storage 102 may be constructed of metal with the wall structure. The combine storage 102 has at least one opening allowing grain to pass through to be unloaded from the interior of the combine storage.

The unloading system 100 includes a conveyor 104 positioned above the floor 112 of the combine storage 102 for conveying grain towards opening 106. At opening 106, conveyor 104 transfers the grain to paddle conveyor 108 and paddles 110.

The conveyor 104 is positioned on the floor 112 of the combine storage 102. The conveyor 104 has a first end 114 for being positioned adjacent a first wall of the combine storage 102. The conveyor 104 has a second end 116 for preferably being positioned adjacent opening 106 of the combine storage 102. The conveyor 104 transfers grain from within the combine storage 102 to opening 106. The conveyor 104 moves grain from first end 114 to end 116 to transfer the grain stored within combine storage 102 to opening 106.

The conveyor 104 of one embodiment is a flat belt conveyor powered by a motor, such as a hydraulic motor. The conveyor 104 may be as wide as necessary to cover the floor 112 of the combine storage 102. The conveyor 104 should extend from one end of the wall to the opening 106 to transport the grain to opening 106.

The conveyor 104 transfers the grain to the paddle conveyor 108 at opening 106. The paddle conveyor 108 transports the grain vertically and outward at exit opening 138 where the grain is deposited into a grain cart or other secondary storage. Paddle conveyor 108 implements a first wheel 120, preferably a first sprocket, rotatably attached to the housing 107 adjacent a first end, and a second wheel 126, preferably a second sprocket, rotatably attached to the housing 107 adjacent the second end.

As shown in FIGS. 2-5, a first shaft 120 preferably rotatably extends transversely through the first end of the housing 107 (preferably through the first and second side walls) for rotatably attaching the first sprocket 118 to the housing 107, and a second shaft 128 preferably rotatably extends transversely through the second end of the housing 107 (preferably through the first and second side walls 140, 142) for rotatably attaching the second sprocket 126 to the housing 107. The shafts 120, 128 may be rotatably mounted to the side walls of the housing 107 via bearings or the like. The sprockets 118, 126 may be standard, off-the-shelf roller chain drive sprockets or the like, keyed or otherwise fixed to the respective shaft 120, 128 substantially centered between the side walls 140, 142. In one embodiment, the paddles 110 are approximately as wide as the space between walls 140, 142 such that the paddles will move the grain found between the walls 140, 142.

The paddle conveyor 108 includes a belt, preferably a roller chain 144, passing about the first and second sprockets 118, 126. The roller chain 144 is also preferably an off-the-shelf item that acts with the sprockets 118, 126 to form a chain drive.

A plurality of spaced apart paddles 110 attached to the chain 144 transport the grain. Each paddle 110 may be rectangular shaped and is preferably made of rubber. The paddles 110, while somewhat flexible, must be rigid enough to push grain without excessive flexing. In one embodiment, the paddles 110 are constructed from a resilient material. The housing 107 is preferably shaped and sized so that the paddles 110 are covered except at the opened ends 106, 138 to provide a protective cover extending over the top and at least a portion of the sides of the sprockets 118, 126, the chain 144, and the paddles 110 to provide safety and protection. Each paddle 110 is preferably attached to a link of the chain 110 by a rigid connector 146 or the like.

Paddles 130 located towards the bottom of housing 107 push the grain towards opening 138 in direction 122. These paddles 130 extend downward towards the floor of housing 107 to sweep the grain to opening 138. Paddles 132 return from opening 138 to opening 106 to begin the process of sweeping the grain to opening 138. Such an endless loop of paddles 110 enable the paddle conveyor 108 to continue sweeping the grain from opening 106 to opening 138 to second storage, such as a grain cart or bin. Paddles 132 move in direction 124 towards opening 106. Paddles 130 move in direction 122 toward opening 138.

Drive 136 of paddle conveyor 108 rotates one of the sprockets 118, 126 to cause the chain 144 to rotate about the first and second sprockets 118, 126 and cause the paddles 110 to sweep grain from the floor of the housing 107 to opening 138. The drive 136 preferably includes a motor and a gear box for reducing the speed or revolutions per minute of the drive or output shaft of the motor and changing the axis of rotation of the drive or output shaft of the motor, and a belt drive 148 or the like for transferring power from the gear box to the shaft 128. The motor and gear box are preferably mounted on the second end of the housing 107. The motor may be a hydraulic motor or other motor.

As shown in FIG. 7, the belt drive 148 may include a first pulley 150 or sprocket attached to the drive or output shaft of the gear box, a second pulley 152 or sprocket attached to one end of the shaft 128, and a belt or chain 154 extending between the first and second pulleys 150, 152. The belt drive 148 transfers power from the motor to the sprocket 126 to cause the chain 144 and paddles 110 to circle about the sprockets 118, 126 in the direction of the arrows 122, 124. The motor enables movement of paddles 110 thus causing paddles 110 to push grain toward the second end of the housing 107 to exit 138. A protective cover or housing may be provided over the pulley 150, 152 and belt 154.

In another embodiment, the paddle conveyor 108 may be retrofitted on an existing hopper of a combine. The augers found within the combine storage, such as a hopper, transfer the grain from inside the combine storage to the paddle conveyor 108. The augers transfer the grain outside of the combine storage and deposit the grain to paddle conveyor.

As shown in FIGS. 3-5, the paddle conveyor may be operated within a housing that at least partially encloses the paddles 110. The housing provides two openings 136, 138 within the housing to allow the grain to be deposited from the combine storage into the housing and to allow the paddles to transfer the grain into a secondary storage, such as grain cart. In another embodiment shown in FIGS. 6 and 7, the housing may be open in the bottom. The grain may be deposited onto plane 162. The paddles then push the grain along plane 162. The plane may provide side walls 158, 160 to prevent loss of the grain at the sides of the plane.

Figure 8:
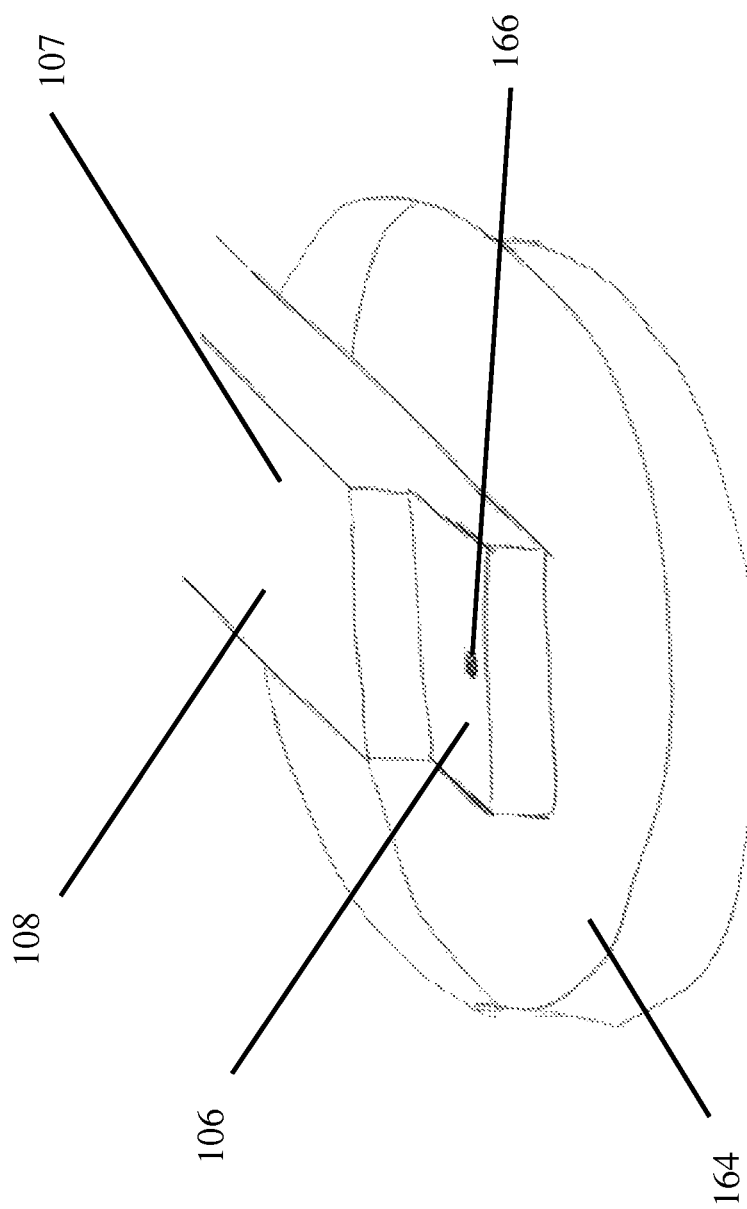
FIG. 8 is an environmental view of one embodiment of the present invention.
Figure 9:
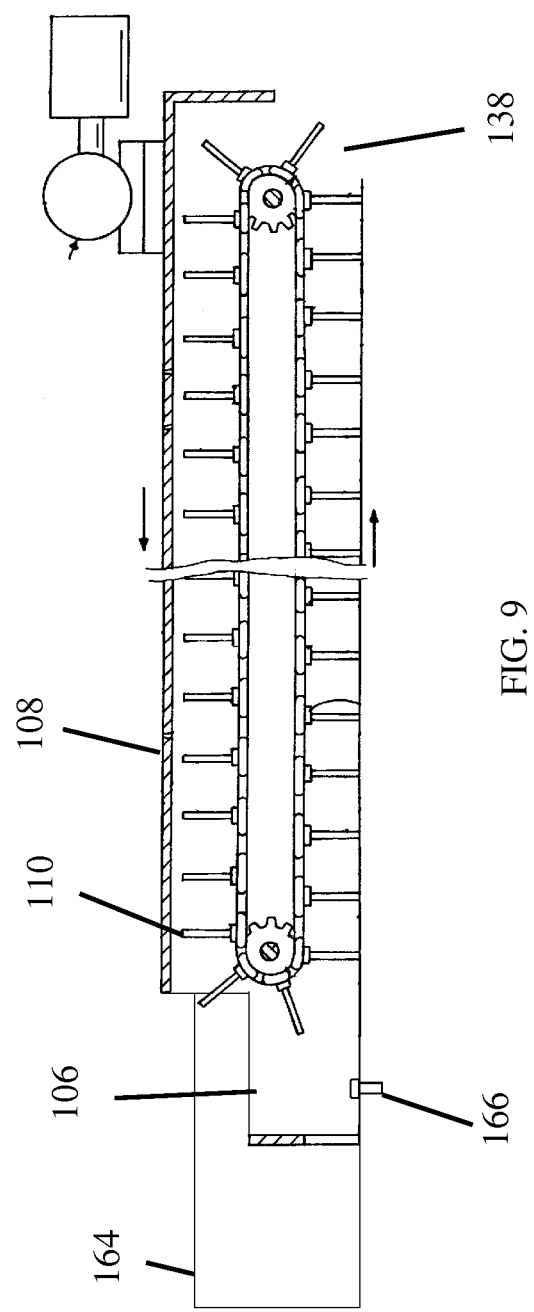
FIG. 9 is a sectional view thereof.
Figure 10:
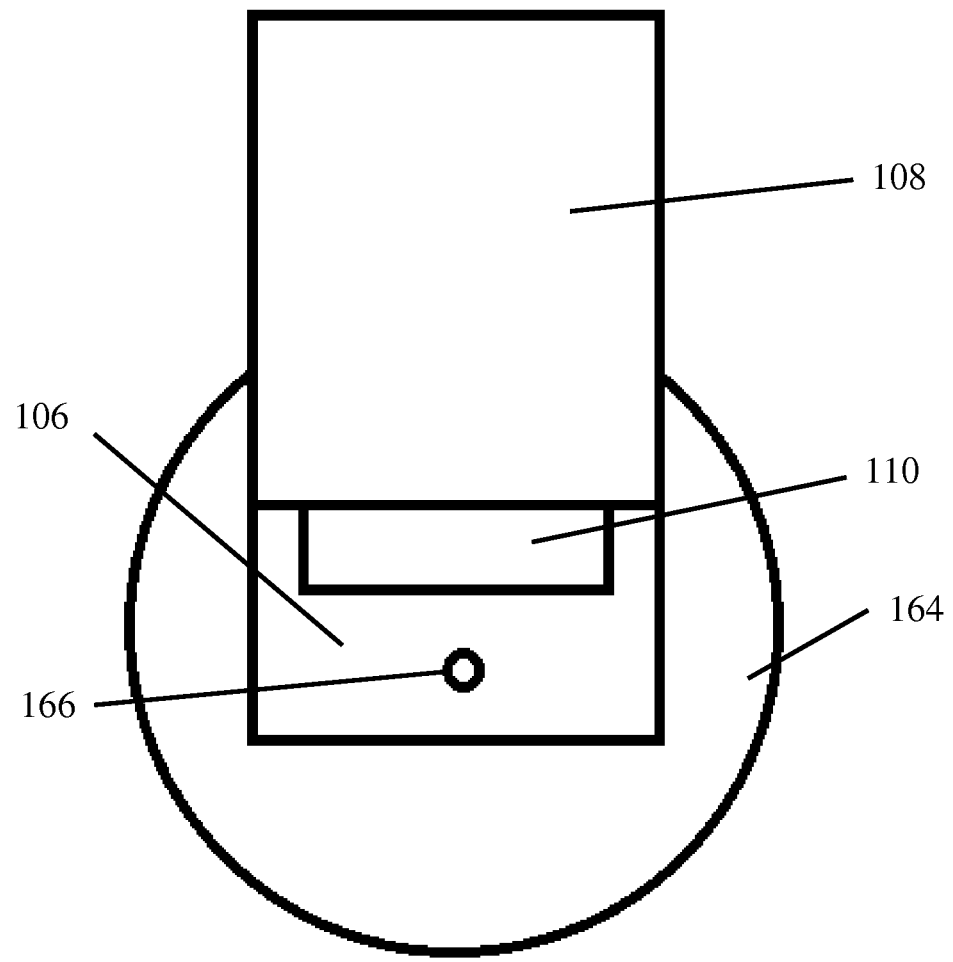
FIG. 10 is a top view thereof.

FIGS. 8-10 show another embodiment of the paddle system 102 placed within storage 164. In such an embodiment, the grain is transferred from combine storage 102 to storage 164. A conveyor, such as conveyor 104, transfers the grain from combine storage 102 to storage 164. A vertical conveyor may be required to transfer the grain from combine storage 102 to storage 164 depending on the positioning of the storage 164.

In one embodiment, storage 164 secures to the combine at the grain exit of the combine. In another embodiment, the storage 164 and paddle system 108 secure to the combine at the combine exit. Grain exit of the combine transfers the grain to storage 164. The paddle system 108 transfers the grain directly from the grain exit. The paddle system 108 rotates in relation to the combine for unloading the grain at multiple storage areas without moving the combine. The rotation of paddle system 108 reduces the requirement of moving the combine to reach other storage areas.

In another embodiment, the clearance of the combine may not be sufficient to allow the storage 164 to secure to the combine at the grain exit of the combine. In such an embodiment, a conveyor may transport the grain to the storage 164. The paddle system 108 and storage 164 may be pivotally attached to the combine to allow rotation of the paddle system 108 and storage 164.

Storage 164 provides paddle system 102 with access to the grain. Opening 106 of the paddle system 102 accepts the grain into paddle system 102. The paddle system 102 pushes the grain towards the secondary storage.

Paddle system 102 secures to storage 164 to allow the paddle system 102 to rotate. Pivot 166 secures the paddle system 102 and storage 164 to each other. Paddle system 102 rotates for transferring grain to different areas. Instead of requiring the user to move the combine, the user simply rotates the paddle system 102 to access other storage areas. Paddle system 102 rotates in relation to the combine storage 102 and combine. In another embodiment, paddle system 102 and storage 164 both rotate in relation to the combine storage 102 and combine.

Paddle system 102 functions similarly to the paddle systems described above. Paddles 110 transfer grain from opening 106 to opening 138. As discussed above, paddles 110 along the lower section of combine system 108 push the grain to opening 138. The paddles 110 return from opening 138 to opening 106 along the upper section of combine system 108.

In one embodiment, the sweep system 108 secures to storage 164 to such that the sweep system 108 is centrally attached to avoid off set rotation of the sweep system 108 with the storage 164. In such an embodiment in which the sweep system 108 secures to the storage 164, the sweep system 108 are secured to an attachment arm that attaches the sweep system 108 and storage 164 with the combine. The sweep system 108 and storage 164 can be adjusted between an in use position for use and a transport position for travelling. The attachment arm increases the adjustability of the sweep system 108 and storage 164. The attachment arm may vary according to the equipment to which the sweep system 108 attaches.

Although the present invention has been described and illustrated with respect to a preferred embodiment and a preferred use therefor, it is not to be so limited since modifications and changes can be made therein which are within the full intended scope of the invention.

From the foregoing, it will be seen that the present invention is one well adapted to obtain all the ends and objects herein set forth, together with other advantages which are inherent to the structure.

It will be understood that certain features and subcombinations are of utility and may be employed without reference to other features and subcombinations. This is contemplated by and is within the scope of the claims.

As many possible embodiments may be made of the invention without departing from the scope thereof, it is to be understood that all matter herein set forth or shown in the accompanying drawings is to be interpreted as illustrative and not in a limiting sense.

What is claimed is:

1. An apparatus for transferring grain from combine storage of a combine to a secondary storage, the apparatus comprising:
    a first storage for placement of the grain secured to the combine wherein the grain travels from the combine storage into the first storage after exiting the combine storage;
    a housing for transferring the grain from the first storage to the secondary storage, the housing secured to the first storage;
    a base of the first storage that extends laterally outward from the housing for collecting the grain from the combine storage;
    a sidewall of the first storage wherein the sidewall is separate from the housing, the sidewall located laterally outward from the housing;
    a conveyor secured inside of the housing, the conveyor dividing the housing into an upper section and a lower section, the conveyor transporting grain from the first storage into the housing;
    at least one paddle extending perpendicular from the conveyor;
    an intake opening of the housing wherein the intake opening accepts grain into the housing, the intake opening located within the first storage;
    an exit opening of the housing wherein the grain exits the housing at the exit opening, the exit opening outside of the first storage wherein the exit opening is located within the lower section; and
    the paddle transferring grain from the intake opening to the exit opening wherein the paddle travels in the lower section to the exit opening;
    a pivot securing both the first storage and the housing to the combine, the pivot securing the housing to the base interior of the sidewall of the first storage, the first storage and the housing rotatable in relation to the combine wherein the pivot secures the housing to the first storage,
    the intake opening located within the first storage wherein the first storage provides an outer wall located outward from the intake opening.

2. The apparatus of claim 1 wherein the paddle is constructed from rubber.

3. The apparatus of claim 2 wherein the housing passes through a side wall of the first storage.

\* \* \* \* \*